Feb. 19, 1946.  F. ALLEN  2,395,241
MEANS FOR CURING ARTIFICIAL DENTURE
Filed Jan. 25, 1943
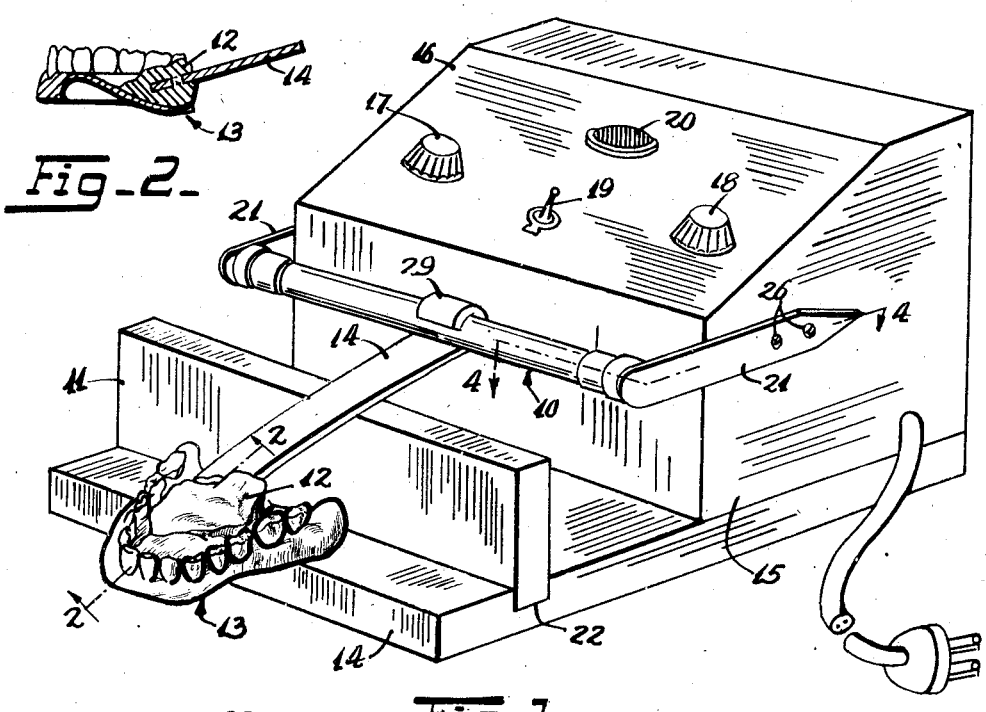
Fig.-2-
Fig.-1-
Fig.-3-
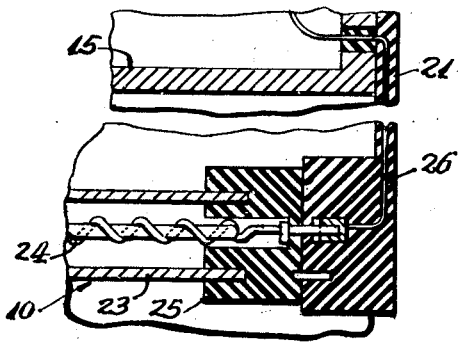
Fig.-4-
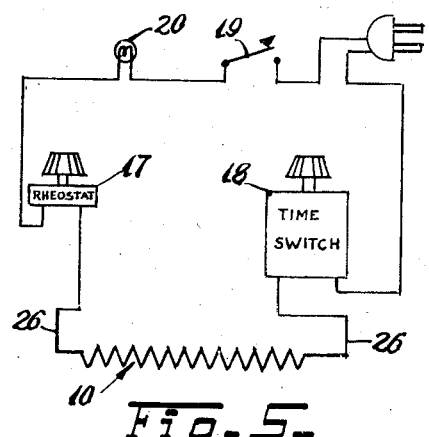
Fig.-5-
INVENTOR.
Frank Allen
BY Zoltan Holecsko
ATTORNEY Patented Feb. 19, 1946

2,395,241

UNITED STATES PATENT OFFICE 2,395,241

MEANS FOR CURING ARTIFICIAL DENTURES

Frank Allen, New York, N. Y.

Application January 25, 1943, Serial No. 473,553

4 Claims. (Cl. 219—19)

This invention relates to a new method and means for curing artificial dentures.

The invention particularly proposes the curing of portions of artificial dentures for repair purposes.

Heretofore, when an old denture broke, or when it became necessary to add artificial teeth to the denture, it was customary to make the necessary repairs on the denture, and as a final step to place the entire denture in a curing furnace. With this method the entire denture is heated and becomes distorted. When it is returned to the owner it rarely fits as well as it did before.

This invention particularly proposes a method and means by which only that portion of the denture which has been altered or repaired is heated for curing. With this invention the remaining portions are unaffected and retain their original shape and size.

More particularly, the invention proposes characterizing the new method of curing artificial dentures by placing an investment, such as plaster, over the area to be cured and then conducting heat to the investment to locally heat the denture for local curing.

The invention contemplates the use of a strip of good heat conducting material, such as copper, for transferring heat to the plaster or other investment.

Still further the invention proposes the construction of means by which this method is very easily carried out.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of means for curing artificial dentures in accordance with this invention.

Fig. 2 is a fragmentary sectional view taken on the line 2—2 of Fig. 1.

Fig. 3 is a perspective view of one end of the heat conducting strip shown in Figs. 1 and 2.

Fig. 4 is a fragmentary horizontal sectional view taken on the line 4—4 of Fig. 1.

Fig. 5 is a schematic wiring diagram of the device.

To facilitate the understanding of the invention we shall first concern ourselves with the means or mechanism by which the method is carried out. The means for curing artificial dentures, in accordance with this invention, includes a substantially horizontally supported rod-like shaped heater 10. A heat resistant member 11 of fireproof material is mounted to the front of the heater 10. A piece of investment 12, such as plaster, is provided, which is for the purpose of encasing an area of a denture 13 which is to be cured. A strip of good heating material 14 is connected with said investment 12 and with said heater 10. While but one denture and heat conducting strip 14 is disclosed it will be apparent that a number of dentures may be cured at the same time.

The mechanism has been built into a compact unit. It has been provided with a base 14 on the back portion of which there is a casing 15 for housing the various electrical units required for operating the heater. This casing 15 has a top panel 16 upon which a rheostat 17, a time switch 18, a manual operable switch 19, and a signal lamp 20 are mounted. A pair of parallel arms 21 is mounted on the sides of the casing 15 and extends frontwards. The rod-like shaped heater 10 is removably mounted between the ends of the arms 21. The base 14 is provided with a transverse groove 22 in which the heat resistant member 11 is mounted and supported.

The heater 10 may comprise a metal tube 23 housing a heater winding 24. This heater winding connects with end sockets 25 which in turn are connected with the necessary cables 26, preferably extended through the arms 21 to the interior of the casing 15. The arms 21 are releasably supported by screws 26 so that they may be slightly loosened to disengage the sockets 25 so that the heater may be removed.

A very simple electrical circuit is illustrated in Fig. 5, but this is merely for convenience in disclosing the invention. Other circuits, and circuits for other types of current may be used provided that the rod-like shaped heater 10 is capable of being heated to a proper temperature. In the simple form of the invention shown in Fig. 5 the heater 10, rheostat 17, switch 19 and signal lamp 20 are shown connected in series.

The movement 12 may comprise plaster of Paris. The conducting material 14 may comprise a strip of copper. One end of this strip is provided with an opening 28 for some of the investment to engage in, to better connect these parts. The other end of the strip 14 is formed with a coil portion 29 adapted to hook on to the heater 10.

The method of curing an artificial denture, in accordance with this invention is as follows:

The denture 13 is repaired in the usual way. Then instead of placing the entire denture in a furnace or oven for the final heat curing step, the repaired portion is encased with the investment 12. The end of the heat conducting material 14 is embedded in the investment 12 which is then allowed to harden. The heater 10 is then set into operation and the denture 13 with the projecting heat conducting material 14 is supported, as illustrated in Fig. 1. The heat from the heater 10 will readily travel through the conducting strip 14 and heat the investment 12 and the encased portion of the denture 13. When the encased portion of the denture has been elevated to the proper temperature, the conductor strip 14 is unhooked from the heater 10 and is allowed to cool. The investment 12 is then chipped off and the denture 13 is finished.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. Means for curing artificial dentures, comprising a substantially horizontal rod-like shaped heater supported at its end portions and being free intermediate of its end portions, a heat resistant strip-like member mounted to the front and substantially parallel to and slightly below said rod-like heater, and a strip of good heat conducting material adapted to be connected at the front end with a denture and having its rear end portion curved for partially embracing said heater and extending forwards and across said strip-like member which acts like a fulcrum for supporting said strip generally horizontal with its curved portion pressed upwardly against said heater.

2. Means for curing artificial dentures, comprising a substantially horizontal rod-like shaped heater supported at its end portions and being free intermediate of its end portions, a heat resistant strip-like member mounted to the front and substantially parallel to and slightly below said rod-like heater, and a strip of good heat conducting material adapted to be connected at the front end with a denture and having its rear end portion curved for partially embracing said heater and extending forwards and across said strip-like member which acts like a fulcrum for supporting said strip generally horizontal with its curved portion pressed upwardly against said heater, said heater including a metal rod and an internal electric winding.

3. Means for curing artificial dentures, comprising a substantially horizontal rod-like shaped heater supported at its end portions and being free intermediate of its end portions, a heat resistant strip-like member mounted to the front and substantially parallel to and slightly below said rod-like heater, and a strip of good heat conducting material adapted to be connected at the front end with a denture and having its rear end portion curved for partially embracing said heater and extending forwards and across said strip-like member which acts like a fulcrum for supporting said strip generally horizontal with its curved portion pressed upwardly against said heater, said heat resistant member being a board of fireproof material.

4. Means for curing artificial dentures, comprising a substantially horizontal rod-like shaped heater supported at its end portions and being free intermediate of its end portions, a heat resistant strip-like member mounted to the front and substantially parallel to and slightly below said rod-like heater, and a strip of good heat conducting material adapted to be connected at the front end with a denture and having its rear end portion curved for partially embracing said heater and extending forwards and across said strip-like member which acts like a fulcrum for supporting said strip generally horizontal with its curved portion pressed upwardly against said heater, said strip comprising a strip of metal.

FRANK ALLEN.